United States Patent
Edwards (10) Patent No.: US 10,114,948 B2
(45) Date of Patent: Oct. 30, 2018

(54) HYPERVISOR-BASED BUFFER OVERFLOW DETECTION AND PREVENTION

(71) Applicant: McAfee, LLC, Santa Clara, CA (US)

(72) Inventor: Jonathan Edwards, Beaverton, OR (US)

(73) Assignee: McAfee, LLC, Santa Clara, CA (US)

( * ) Notice: Subject to any disclaimer, the term of this patent is extended or adjusted under 35 U.S.C. 154(b) by 641 days.

(21) Appl. No.: 14/129,558

(22) PCT Filed: Mar. 15, 2013

(86) PCT No.: PCT/US2013/032290
§ 371 (c)(1),
(2) Date: Dec. 27, 2013

(87) PCT Pub. No.: WO2014/143005
PCT Pub. Date: Sep. 18, 2014

(65) Prior Publication Data
US 2014/0317742 A1 Oct. 23, 2014

(51) Int. Cl.
*G06F 21/56* (2013.01)
*G06F 21/52* (2013.01)

(52) U.S. Cl.
CPC ............ *G06F 21/56* (2013.01); *G06F 21/52* (2013.01)

(58) Field of Classification Search
USPC .......... 726/2, 21, 23, 36; 713/150, 163, 181; 380/255, 264, 276
See application file for complete search history.

(56) References Cited

U.S. PATENT DOCUMENTS

| | | | |
|---|---|---|---|
| 2010/0031360 A1 | 2/2010 | Seshadri et al. | |
| 2012/0102285 A1* | 4/2012 | Savagaonkar | G06F 12/145 711/163 |
| 2012/0179882 A1* | 7/2012 | Bernhard, III | G06F 9/5022 711/156 |
| 2012/0210095 A1* | 8/2012 | Nellans | G06F 12/10 711/206 |
| 2012/0254995 A1* | 10/2012 | Sallam | G06F 21/554 726/22 |
| 2013/0019306 A1* | 1/2013 | Lagar-Cavilla | G06F 21/566 726/22 |

FOREIGN PATENT DOCUMENTS

| | | | |
|---|---|---|---|
| KR | 20120061249 | 6/2012 | ............ G06F 12/14 |
| WO | 2014/143005 A1 | 9/2014 | |

OTHER PUBLICATIONS

International Search Report and Written Opinion; PCT/US2013/032290; pp. 9, dated Dec. 19, 2013.

* cited by examiner

Primary Examiner — Sharif E Ullah
(74) Attorney, Agent, or Firm — Bryne Poh LLP (57) ABSTRACT

Technologies for securing an electronic device include determining addresses of one or more memory pages, injecting for each memory page a portion of identifier data into the memory page, storing an indication of the identifier data injected into each of the memory pages, determining an attempt to access at least one of the memory pages, determining any of the identifier data present on a memory page associated with the attempt, comparing the indication of the identifier data with the determined identifier data present on the memory page, and, based on the comparison, determining whether to allow the access.

9 Claims, 6 Drawing Sheets

FIG. 1

```
        0 1 2 3   4 5 6 7   8 9 A B   C D E F
3000    00000040  12345678  9090c3cc  8b909090
3010    ec8b55ff  db335351  fd271d38  077482d5
3020    d2e9c032  88000000  1d38ff5d  82d9b98c
3030    c1cf8b38  4c8d04e1  310f0801  511b012b
3040    XXXXXXXX  XXXXXXXX  XXXXXXXX  00000040
3050    12345678  348dfffb  d9b90085  3b068b82
3060    f2e08304  8902c883  51890841  81068b0c
3070    8b1a74c3  04e1c108  08014c8d  0189310f
3080    c7045189  00020841  59890000  a41d380c
3090    7482d9b9  87654321  XXXXXXXX  XXXXXXXX
30A0    b9a41d88  31eb82d9  da1780bf  e8cf8b82
30B0    fffd230   2174c084  53535353  5ee8086a
30C0    85000000  c60b75c0  c601ff45  fa7fe905
30D0    cf8b0182  ffd147e8  3b068bff  c601ff45
30E0    87654321  00000080  12345678  511b012b
30F0    f2e08304  8902c883  51890841  81068b0c
3100    74fe5d38  458afb01  c3c95bff  90909090
```

{0FEDCBA9 87654321 12345678} — 216

{12345678 9ABCDEFG} — 218

```
3000  00000040 12345678 9090c3cc 8b909090
3010  ec8b55ff db335351 fd271d38 077482d5
3020  d2e9c032 88000000 1d38ff5d 82d9b98c
3030  c1cf8b38 4c8d04e1 310f0801 511b012b
3040  00c0840f 57560000 87654321 00000040
3050  12345678 348dfffb d9b90085 3b068b82
3060  f2e08304 8902c883 51890841 81068b0c
3070  8b1a74c3 04e1c108 08014c8d 0189310f
3080  c7045189 00020841 59890000 a41d380c
3090  7482d9b9 c8b0182 87654321 c8cf8b82
30A0  b9a41d88 31eb82d9 da1780bf c8cf8b82
30B0  ffffd230 2174c084 53535353 5ee8086a
30C0  85000000 c60b75c0 c601ff45 fa7fe905
30D0  cf8b0182 ffd147e8 3b068bff c601ff45
30E0  00000080 12345678 511b012b
30F0  f2e08304 8902c883 51890841 81068b0c
3100  74fe5d38 458afb01 c3c95bff 90909090
```

FIG. 3

```
3000    00000000  00000000  0000000   00000000 ⎫
3010    00000000  00000000  0000000   00000000 ⎬ 413
....                                           ⎭
3FB0    00000000  00000000  00000000  00000040
3FC0    cf8b0182  ffd147e8  3b068bff  8b2f74c3
3FD0    87654321  4c8d04e1  310f0801  511b012b  ─ 414
3FE0    f2e08304  8902c883  51890841  81068b0c
3FF0    74fe5d38  458afb01  c3c95bff  90909090
                                                ⎬ 402

4000    xxxxxxx   xxxxxxx   xxxxxxx   xxxxxxx  ⎫
...                                             ⎬ 404
4FF0    xxxxxxx   xxxxxxx   xxxxxxx   xxxxxxx  ⎭

5000    00000000  00000000  0000000   00000000 ⎫
5010    00000000  00000000  0000000   00000000 ⎬ 416
....                                            ⎭
5FB0    00000000  00000000  00000000  00000040
5FC0    cf8b0182  ffd147e8  3b068bff  8b2f74c3
5FD0    87654321  4c8d04e1  310f0801  511b012b  ─ 418
5FE0    f2e08304  8902c883  51890841  81068b0c
5FF0    74fe5d38  458afb01  c3c95bff  90909090
                                                ⎬ 406

6000    xxxxxxx   xxxxxxx   xxxxxxx   xxxxxxx  ⎫
...                                             ⎬ 408
6FF0    xxxxxxx   xxxxxxx   xxxxxxx   xxxxxxx  ⎭

7000    00000000  00000000  0000000   00000000 ⎫
7010    00000000  00000000  0000000   00000000 ⎬ 420
....                                            ⎭
7FB0    00000000  00000000  00000000  00000040
7FC0    cf8b0182  ffd147e8  3b068bff  8b2f74c3
7FD0    87654321  4c8d04e1  310f0801  511b012b  ─ 422
7FE0    f2e08304  8902c883  51890841  81068b0c
7FF0    74fe5d38  458afb01  c3c95bff  90909090
                                                ⎬ 410

8000    xxxxxxx   xxxxxxx   xxxxxxx   xxxxxxx  ⎫
...                                             ⎬ 412
8FF0    xxxxxxx   xxxxxxx   xxxxxxx   xxxxxxx  ⎭
```

*FIG. 4*

|  | 514A | 514B | 514C | 502 |
|---|---|---|---|---|
| 3000 | 00000040 | 1d38ff5d | 9090c3cc | 8b909090 |
| 3010 | ec8b55ff | db335351 | fd271d38 | 077482d5 | 506
| 3020 | d2e9c032 | 88000000 | 1d38ff5d | 82d9b98c |
| 3030 | c1cf8b38 | 4c8d04e1 | 310f0801 | 511b012b |
| 3040 | 00c0840f | 00000040 | 51890841 | 1d38ff5d |
| 3050 | 51890841 | 348dfffb | d9b90085 | 3b068b82 | 508
| 3060 | f2e08304 | 8902c883 | 51890841 | 81068b0c |
| 3070 | c7045189 | 00020841 | 59890000 | a41d380c |
| 3080 | 7482d9b9 | 51890841 | 00000040 | 51890841 |
| 3090 | b9a41d88 | 31eb82d9 | da1780bf | e8cf8b82 | 510
| 30A0 | ffffd230 | 2174c084 | 53535353 | 5ee8086a |
| 30B0 | 85000000 | c60b75c0 | c601ff45 | fa7fe905 |
| 30C0 | cf8b0182 | 00000040 | 3b068bff | c601ff45 |
| 30D0 | 51890841 | 00000080 | 12345678 | 511b012b | 512
| 30E0 | f2e08304 | 8902c883 | 51890841 | 81068b0c |

|  | 514D |  |  | 504 |
|---|---|---|---|---|
| 3000 | 00000040 | 1d38ff5d | 9090c3cc | 8b909090 |
| 3010 | ec8b55ff | db335351 | fd271d38 | 077482d5 | 516
| 3020 | d2e9c032 | 88000000 | 1d38ff5d | 82d9b98c |
| 3030 | c1cf8b38 | 4c8d04e1 | 310f0801 | 511b012b |
| 3040 | 00c0840f | 51890841 | 348dfffb | 1d38ff5d |
| 3050 | 51890841 | 348dfffb | d9b90085 | 3b068b82 | 518
| 3060 | f2e08304 | 8902c883 | 51890841 | 81068b0c |
| 3070 | c7045189 | 00020841 | 59890000 | a41d380c |
| 3080 | 7482d9b9 | 51890841 | 00000040 | 51890841 | 514E
| 3090 | b9a41d88 | 31eb82d9 | da1780bf | e8cf8b82 |
| 30A0 | ffffd230 | 2174c084 | 53535353 | 5ee8086a | 520
| 30B0 | 85000000 | c60b75c0 | c601ff45 | fa7fe905 |
| 30C0 | cf8b0182 | 00000040 | 3b068bff | c601ff45 |
| 30D0 | 51890841 | 00000080 | 12345678 | 511b012b | 522
| 30E0 | f2e08304 | 8902c883 | 51890841 | 81068b0c |

HYPERVISOR-BASED BUFFER OVERFLOW DETECTION AND PREVENTION

TECHNICAL FIELD

Embodiments of the present invention relate generally to computer security and, more particularly, to hypervisor-based buffer overflow detection and prevention.

BACKGROUND

Native operating system services can prevent security software from installing arbitrary hooking within the kernel of operating systems. Security software is thus prevented from filtering all behaviors of an electronic device, including potentially malicious actions by malware. Malware may include, but is not limited to, spyware, rootkits, password stealers, sources of spam, sources of phishing attacks, sources of denial-of-service-attacks, viruses, loggers. Trojans, adware, or any other digital content that produces malicious activity.

An operating system's filtering functionality may be limited, and may only be available on timelines decided by the operating system vendor. Malware can operate and reside at the same level as security software, particularly in the operating system kernel and thus compromise both the operating system and the integrity of the security software itself.

Many forms of aggressive kernel mode malware tamper with user mode memory to accomplish malicious tasks such as injecting malicious code dynamically, modifying user mode code subsections to alter execution paths and redirect into malicious code, and modify user mode data structures to defeat security software. Additionally, some malware may attack anti-malware applications and processes from the kernel by tampering with process memory code and data subsections to deceive the detection logic.

Kernel mode rootkits and other malware employ various methods to hide their presence from user mode applications and kernel mode device drivers. The techniques used may vary, depending upon where the infection takes place. For example, malware can attack the kernel active process list of an operating system to delist or unlink a rootkit or other malware process. Other malware may tamper with the code subsections of process access and enumeration functions.

BRIEF DESCRIPTION OF THE DRAWINGS

For a more complete understanding of embodiments of the present invention, and the advantages thereof, reference is now made to the following written description taken in conjunction with the accompanying drawings, in which.

DETAILED DESCRIPTION OF EMBODIMENTS OF THE INVENTION

Figure 1:
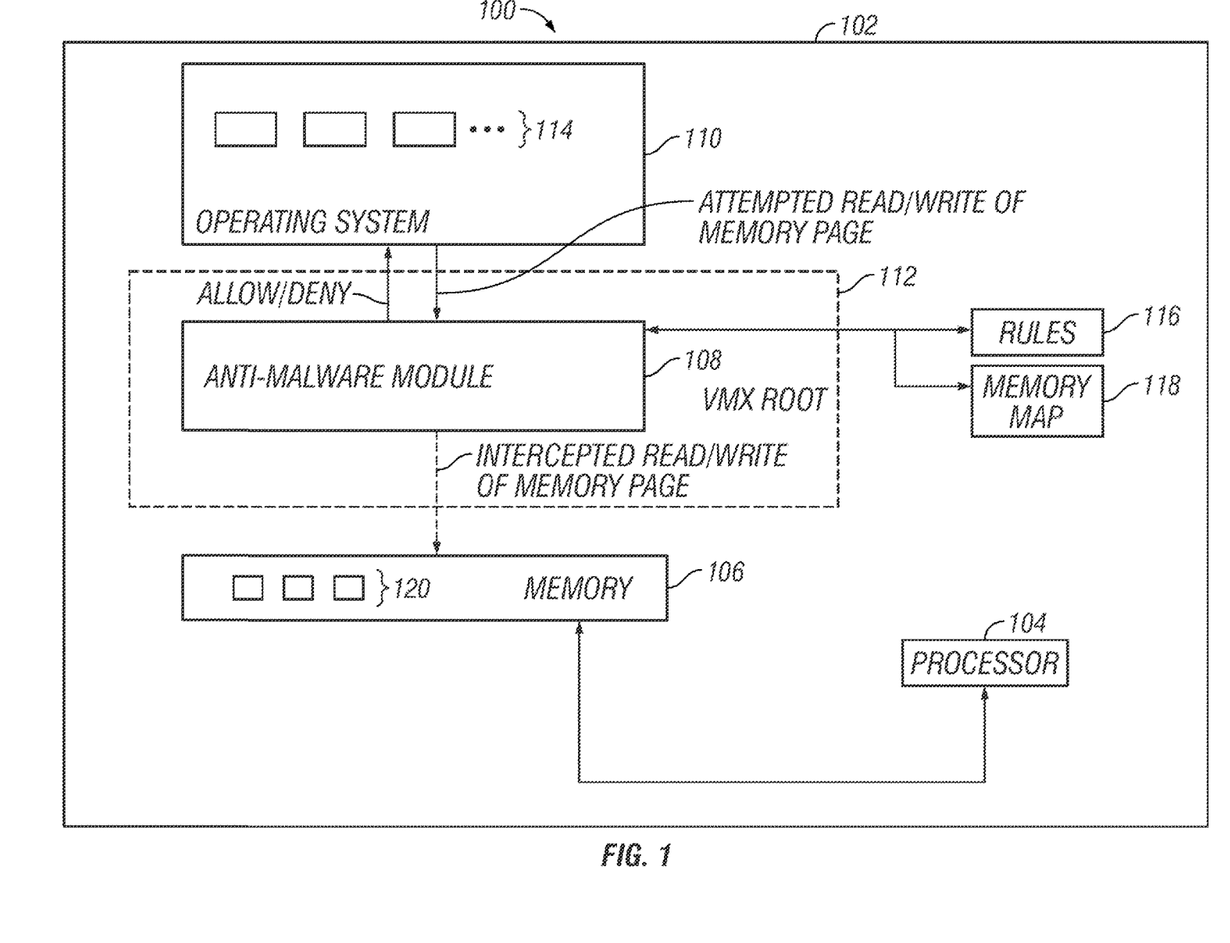
FIG. 1 is an example embodiment of a hypervisor-based system for buffer overflow detection and prevention.

FIG. 1 is an example embodiment of a system 100 for buffer overflow detection and prevention. In one embodiment, such detection and prevention may be performed at least in part by a security module operating below operating systems of an electronic device. In a further embodiment, such a security module may be operating in conjunction with a hypervisor.

System 100 may include, an anti-malware module 108 configured to protect system resources of an electronic device 102. Such system resources may include, for example, memory 106. Furthermore, anti-malware module 108 may be configured to protect memory 106 and contents therein from buffer overflow or buffer overrun. Buffer overflow may result from operations of writing data to a buffer wherein the write overruns or under runs the buffer's boundary and overwrites adjacent memory. A buffer may include a region of memory storage. The result of a buffer overflow may include, for example, erratic operation of software, crashes, access errors, or an exploitation. Buffer overflow may be caused by, for example, a software bug, a software incompatibility, or malicious code such as malware. Malware may exploit buffer overflow weaknesses to further hijack operation of electronic device 102.

In one embodiment, anti-malware module 108 may protect electronic device 102 from buffer overflow by determining what portions of memory 106 are unallocated by, for example, an operating system 110. Anti-malware module 108 may be configured to trap an attempted read or write to portions of memory 106 designated as unallocated. After trapping such attempts, anti-malware module 108 may be configured to determine whether the attempted read or write was made by a properly authorized entity in a properly authorized manner. For example, anti-malware module 108 may determine whether the attempt to read or write to unallocated portions of memory 106 was made by kernel portions of operating system 110. Furthermore, anti-malware module 108 may determine whether the attempt to read or write to unallocated portions of memory 106 were made by standard or authorized allocation or deallocation functions. Any other attempt to write to or read unallocated portions of memory 106 may be the result of a buffer overflow. Anti-malware module 108 may be configured to take any suitable corrective action to unauthorized attempts to read or write unallocated portions of memory 106, or to allow any authorized attempts.

System 100 may be configured to protect any electronic device, such as electronic device 102. Electronic device 102 may be implemented in any suitable fashion, such as in a computer, laptop, server, console, personal data assistant, phone, mobile device, system-on-a-chip, server, or any other device configurable to interpret and/or execute program instructions and/or process data. Although electronic device 102 is illustrated with example configuration, electronic device 102 may include any suitable number or kind of components.

Anti-malware module 108 may be resident upon electronic device 102 or communicatively coupled to electronic device 102 so as to monitor access of resources. Anti-malware module 108 may be implemented in any suitable manner, such as by a program, application, script, function, library, code, software, firmware, hardware, or other mechanisms for carrying out the functionality described herein.

Anti-malware module 108 may be configured to access any suitable information to determine how to protect electronic device 102. For example, anti-malware module 108 may include or be communicatively coupled to rules 116. Rules 116 may include any suitable number or kind of security logic for defining operation of anti-malware module 108. For example, rules 116 may specify what portions or functions of operating system 110 are authorized to allocate or deallocate memory. Furthermore, rules 116 may define behavioral rules for which elements of electronic device 102 may be determined to be malicious or safe. In addition, rules 116 may include signatures, hashes, or other content identifications of malware that may be used in comparison with elements on electronic device. Rules 116 may be implemented by, for example, a module, code, function, web service, server, reputation server, database, file, record, or other suitable entity. Rules 116 may be resident, for example, on electronic device 102, on a server communicatively coupled to electronic device 102, or within anti-malware module 108.

In another example, anti-malware module 108 may include or be communicatively coupled to memory map 118. Memory map 118 may be constructed and maintained to illustrate which portions of memory 106 have been allocated or not by operating system 110. Memory map 118 may be used in combination with rules 116 such that anti-malware module 108 may determine which portions of memory 106 to trap read, write, execute, or other operations. Memory map 118 may be maintained by, for example, anti-malware module 108 in real-time. Memory map 118 may be implemented by, for example, a file, database, data structure, or other suitable entity.

Electronic device 102 may include an operating system 110, which may include one or more entities 114 using operating system 110 to execute and access resources of electronic device 102. Entities 114 may include, for example, any suitable number or kind of applications, processes, programs, functions, scripts, executables, drivers, or shared libraries. Some of entities may include operating system kernel components, as well as functions such as those for allocation and deallocation. Furthermore, some of entities may include entities with bugs or anomalies that may cause buffer overflows. In addition, some of entities may include entities with malicious code that may intentionally cause buffer overflows. Access to system resources may be virtualized whereby memory access is made through one or more page tables which may map linear memory addresses (used by operating system 110 or entities 114 to access memory) to physical addresses. Operating system 110 and entities 114 may thus view memory 106 through the use of one or more memory pages 120. Operating system 110 and entities 114 may view memory 106 as linear and contiguous as a result.

In addition, electronic device 102 may include a processor 104 communicatively coupled to memory 106. Processor 104 may include various resources utilized by anti-malware module 108 to protect linear address mapping. For example, processor 104 may include any suitable kind and type of facilities, features, or components for virtualization.

To perform overflow detection and prevention, system 100 may include any suitable number and kind of components for use with anti-malware module 108. Such components may be included with anti-malware module 108 or be communicatively coupled to anti-malware module 108.

Anti-malware module 108 may execute partially or fully in a below-operating system area 112. Anti-malware module 108 may include a below-operating system trapping agent be configured to trap various attempted accesses of resources electronic device 101, such as read, write, or execute of unallocated portions of memory 106 such as specific portions of pages 120. Anti-malware module 108 may be configured to create a triggered event associated with the trapped attempted access, and to evaluate the triggered event with an event handler. In one embodiment, such an event handler may reside within anti-malware module 108. Anti-malware module 108 may be configured to consult one or more of rules 118 to determine how to handle the triggered event. Anti-malware module 108 may also be configured to evaluate the triggered event's propensity to be an indication of malware, or a malicious attempt to subvert the resources or operation of electronic device 102. Furthermore, anti-malware module 108 may be configured to provide a determination of whether the triggered event should be allowed or denied, or may be configured to yield another corrective action.

Anti-malware module 108 may be implemented at a lower functional level than the operating systems in electronic device 102. For example, anti-malware module 108 may intercept attempted accesses of a processor 104 or memory 106. Anti-malware module 108 may be running on a processor of electronic device 102 without use of an operating system. In one embodiment, anti-malware module 108 may be operating on a bare-metal environment or execution level. In another embodiment, anti-malware module 108 may be operating in a trusted memory services layer (TMSL). Anti-malware module 108 may be running at a higher execution priority, as defined by a processor of electronic device 102, than all operating systems of electronic device 102. For example, in the context of a hierarchical protection domain model using protection rings, wherein a lower number represents a higher priority, operating system 110 may be operating at "Ring0" while anti-malware module 108 may be operating at "Ring −1." In some embodiments of processors, the concept of "Ring −1" may be known as "Ring0 privileged mode," and the concept of "Ring0" may be known as "Ring0 non-privileged mode." Operation in "Ring −1" or "Ring0 privileged mode" may entail more additional overhead and expense than "Ring0" or "Ring0 privileged mode." Operating systems of electronic device 102 may run at Ring0. On processors such as INTEL processors, the mode of "VMX Root" may be equivalent to "Ring0 privileged mode" and the mode of "VMX Non-root" may be equivalent to "Ring0."

Anti-malware module 108 may operate transparently to entities 114 running at Ring0 or higher. Thus, whether anti-malware module 108 is present or not, the attempted access of a resource may be requested by operating system 110 in the same manner. Anti-malware module 108, when enforcing a rule regarding a trapped action, may allow the request to happen, may deny the request, or may take other corrective action. To deny the request, anti-malware module 108 may simply not pass the request to the resource or processor, or may provide a spoofed or dummy reply to the request to convince the requestor that the action has occurred.

By running at "Ring −1" at a higher priority than the pertinent operating systems of electronic device 102 or below the pertinent operating systems of electronic device 102, anti-malware module 108 may avoid much of the malware that plagues operating systems such as operating system 110. Malware may trick operating system 110 or even anti-malware software running at "Ring0," as malware may also be running at "Ring0" priority. However, malware on electronic device 102 must still make requests of resources if the malware is to carry out malicious activities. Thus, trapping operations linked to sensitive resources may be better accomplished by an anti-malware module running below the level of operating systems in electronic device 102.

In one embodiment, anti-malware module 108 may be implemented in a virtual machine monitor. In another embodiment, anti-malware module 108 may be implemented in a hypervisor. Such embodiments may operate below the level of operating systems as described for anti-malware module 108.

Anti-malware module 108 may handle triggered events fully or partially in itself, or may pass off handling to one or more other modules to which anti-malware module 108 is communicatively coupled. Such other modules may be operating at the same priority ring as anti-malware module 108 or within operating system 110. Such modules may be implemented in any suitable manner.

Resources that are protected by anti-malware module 108 may include, for example, a processor such as processor 104, features of processor 104, memory such as memory 106, the entities residing in memory 106 such as memory pages 120, data structures, or the entities residing in memory 106 for execution by the processor such as functions, processes, or applications. In the example of FIG. 1, anti-malware module 108 may be configured to protect or monitor memory pages 120 in order to perform overflow detection and prevention.

Anti-malware module 108 may be configured to trap the execution of operations originating from operating system 110 or entities 114 to access monitored system resources. Anti-malware module may include a control structure configured to trap specific attempted accesses of system resources. Any suitable control structure may be used. In one embodiment, such a control structure may include a virtual machine control structure configured to trap such execution by providing flags for manipulation. Anti-malware module 108 may be configured to trap any suitable operation originating from operating system 110 involving an access of system resources. Such trapped operations may include, for example: reading, writing and execution of particular portions of memory pages 120 determined by, for example, memory map 118 to be unallocated by operating system 110. Any such operations may cause a Virtual Machine Exit ("VM Exit"), which may be trapped and handled by anti-malware module 108.

Memory 106 may be in the form of physical memory or pages of virtualized memory. Virtualized memory may include memory available to, for example, operating system 110 or entities 114 and has been abstracted from physical memory and/or storage. Virtualized memory may appear as a contiguous block of memory to operating system 110 or entities 114, although the actual spaces used may be spread disparately across actual physical memory. Virtualized memory may be virtualized according to extensions of processor 104. The address space of virtualized memory may be divided into memory pages, such as memory pages 120. The memory pages may be each of equal size, such as four kilobytes. In hexadecimal notation, such a four kilobyte page may be represented as 0x1000 bytes. Memory pages 120 may thus start on multiples of 0x1000. Memory pages 120 are often illustrated using sixteen bytes (in hexadecimal, 0x10 bytes) per line.

Processor 104 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 104 way interpret and or execute program instructions and/or process data stored in memory 106. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such as anti-malware module 108 may reside in memory 106 for execution by processor 104.

Processor 104 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. Processor 104 may also include register renaming logic and scheduling logic, which generally allocate resources and queue the operation corresponding to the convert instruction for execution. After completion of execution of the operations specified by the code instructions, back end logic within processor 104 may retire the instruction. In one embodiment, processor 104 may allow out of order execution but requires in order retirement of instructions. Retirement logic within processor 104 may take a variety of forms as known to those of skill in the art (e.g., re-order buffers or the like). The processor cores of processor 104 are thus transformed during execution of the code, at least in terms of the output generated by the decoder, the hardware registers and tables utilized by the register renaming logic, and any registers modified by the execution logic In operation, anti-malware module 108 may be monitoring accesses of memory 106 on electronic device 102. Anti-malware module 108, or another suitable entity, may monitor what portions of memory 106 and memory pages 120 have been allocated by operating system 110. Such portions may be stored, updated, and accessed through memory map 118.

Upon an attempted access of an unallocated portion of a memory page 120, a VM exit may be generated. Anti-malware module 108 may evaluate the VM exit. The source of the VM exit may be determined. For example, if the source of the VM exit is determined to be an authorized function, such as an operating system allocation function or deallocation function, then anti-malware module 108 may allow the attempted access. If the source of the VM exist is determined to be from an unauthorized or unknown function, code, or process, then anti-malware may prevent the attempted access.

In another example, if the source of the VM exit is determined to be an authorized entity, such as a kernel portion of operating system 110 configured to perform allocation and deallocation, then anti-malware module 108 may allow the attempted access. If the source of the VM exist is determined to be an unauthorized entity or an unknown entity, then anti-malware module 108 may prevent the attempted access.

In such a case where access is prevented, anti-malware module 108 may take any suitable action. Such actions may include, for example: blocking the request; redirecting the request to, for example, a sandbox or honeybot process;

reporting the responsible entity to a reputation or anti-malware server; or deleting, quarantining, or otherwise manipulating the responsible entity, process, or file.

Figure 2:
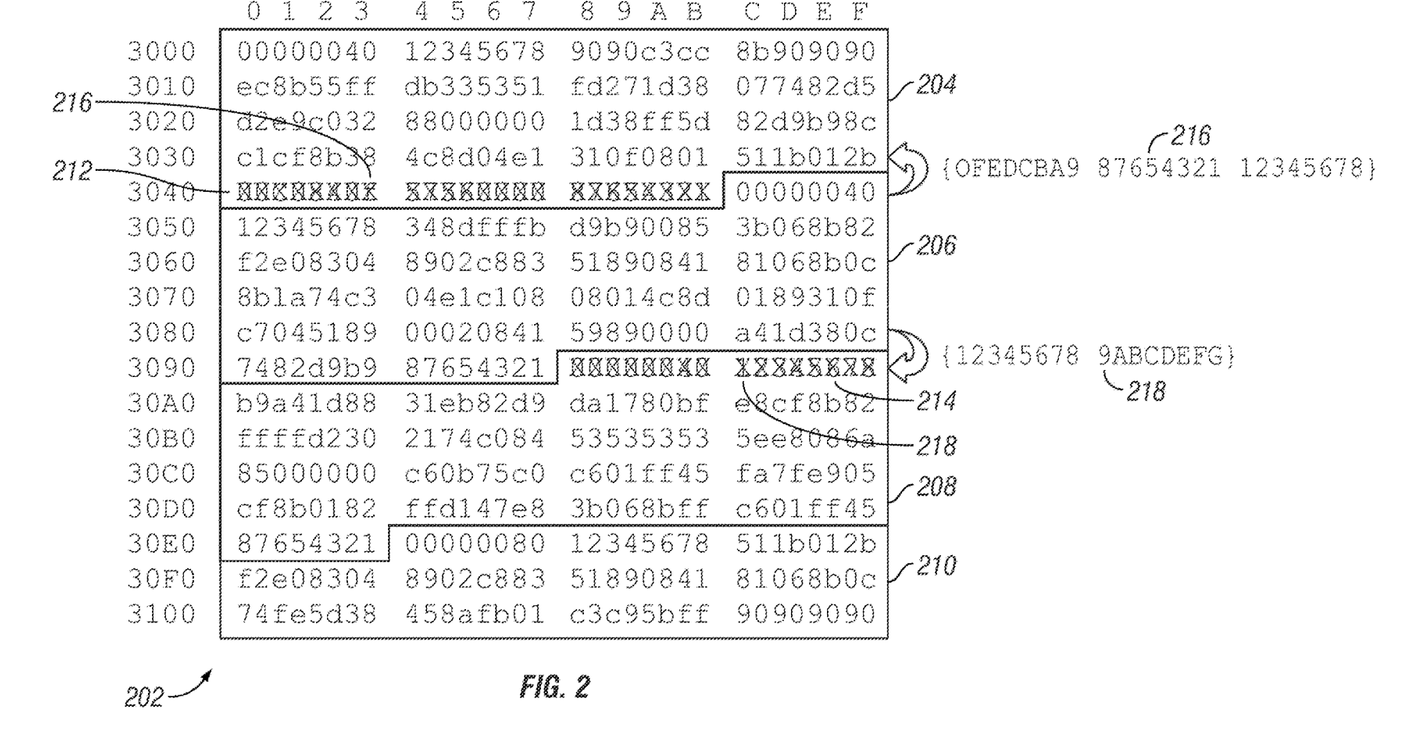
FIG. 2 is an illustration of a memory page when experiencing a buffer overflow.

FIG. 2 is an illustration of a memory page 202 when experiencing a buffer overflow. Memory page 202 may include three 64-byte (0x40 byte) allocations, created by an operating system, such as allocations 204, 206, 208. Memory page 202 may include some space 210 that is unallocated.

For example, in allocation 206, a software error or malicious code may cause a buffer overflow. The contents of allocation 206 may be overwritten. Such overwriting may continue past the boundaries of allocation 206. For example, such overwriting may continue past the last value of allocation 206 into allocation 208, causing values 214 to be overwritten with values 218. Values 218 may include garbage or meaningless values, or values configured to cause harm to electronic device 102. In another example, overwriting may occur before the first portion of allocation 206, causing values 212 to be overwritten with values 216. Values 216 may include garbage or meaningless values, or values configured to cause harm to electronic device 102.

While such an overwriting of values 212 before allocation 206 may be known as underflow, such behavior may still fall under the general designation as a buffer overflow In another example, in allocation 208, a software error or malicious code may cause a buffer overflow such that portions of space 210 may be overwritten.

System 100 may be configured to detect such buffer overflows as illustrated in FIG. 2 through the detection of attempted access of unallocated portions of pages such as page 202. System 100 may be further configured to determine whether such attempts were made by authorized functions or entities.

Figure 3:
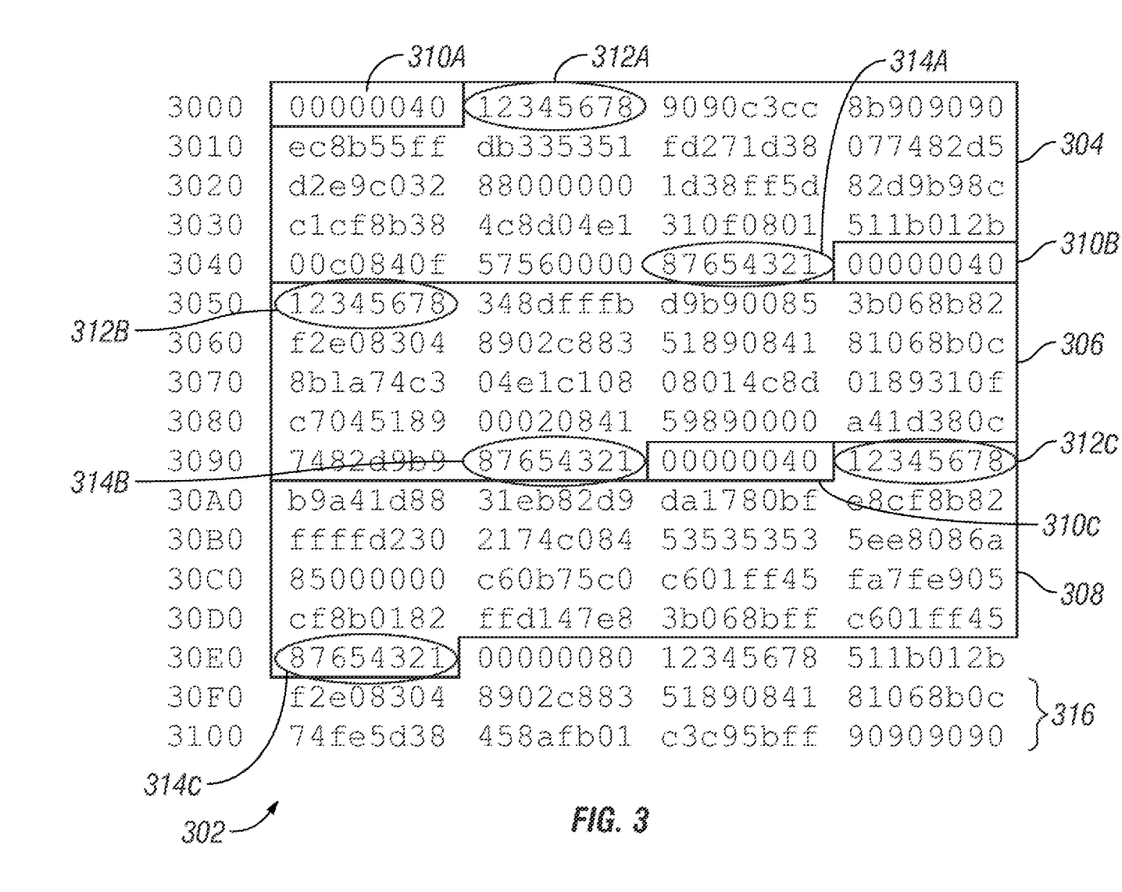
FIG. 3 is an illustration of a memory page which may be evaluated by consistency checking or code-checking.

FIG. 3 is an illustration of a memory page 302 which may be evaluated by consistency checking or code-checking. System 100 may be configured to overcome one or more drawbacks of such checking. The consistency checking or code-checking may include determining whether specified elements of an allocation have been overwritten. The specified elements may be generally known as "canaries," in reference to a figurative canary-in-a-coal-mine, wherein an element is checked to see if it still intact, alive, or functioning as an indicator of a large condition.

When an allocation of a page is made, the responsible operating system may issue a size indicator 310 of the allocation and embed such a size indicator in a memory location immediately before the allocation. A purpose of the size indicator 310 may include, as a page is read, an allocation may be managed by signaling to the reader how many bytes the allocation contains. The size of allocations may be consistent or varied for a given operating system, as needed.

Furthermore, when an allocation of a page is made, the responsible operating system may issue a "canary" in the form of a specified code, byte sequence, or other information at a designated portion or portions of the allocation. The specified code may include contents known to the anti-malware entity or operating system reading the data but not externally. For example, an allocation may include an initial consistency code 312 and a terminal consistency code 314 inserted by the operating system or another entity upon creation of the allocation. Initial consistency codes 312 may be consistent across all allocations or across allocations of a specified type. Furthermore, terminal consistency codes 314 may be consistent across all allocations or across allocations of a specified type. Initial consistency codes 312 and terminal consistency codes 314 may be equivalent or different.

Memory page 302 may include, for example, allocations 304, 306, 308 and unallocated space 316. Each allocation may include a respective initial consistency code 312 and terminal consistency code 314. As a given on of allocations 304, 306, 308 is read, it may be determined whether the expected initial consistency code 312 is in the predetermined location. If not, it may be determined that the given allocation was overrun by a buffer overflow from a lower-addressed allocation.

As a given one of allocations 304, 306, 308 is read by, for example, an operating system on behalf of an executing entity, it may be determined whether the expected terminal consistency code 314 is in the predetermined location. If not, it may be determined that the given allocation was overrun by a buffer overflow from a higher-addressed allocation.

However, such determinations might be possible only after a buffer overflow has already occurred. Thus, the buffer overflow might not be prevented. Furthermore, such determinations might not, on their own without reference to other determinations, indicate what range of addresses the buffer overflow originated, as the buffer overflow may have consumed more than one allocation. In addition, such determinations might not detect an overflow into unallocated space 316. Furthermore, each of the codes inserted into an allocation for the purpose of consistency checking may remove available space for actual user or process content to be resident within the allocation. In some embodiments, system 100 may be configured to overcome one or more of these issues.

Figure 4:
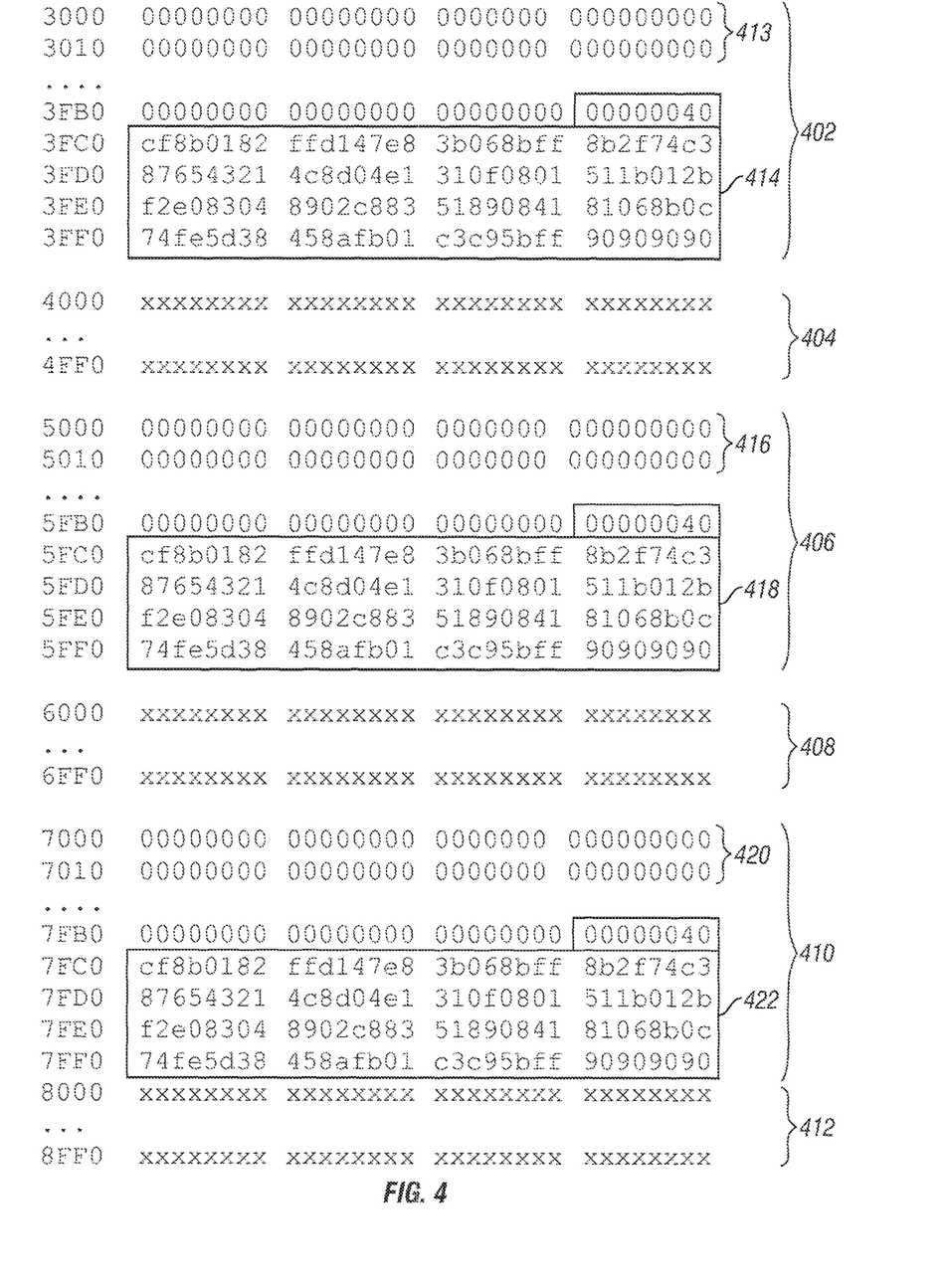
FIG. 4 is an illustration of memory pages protected by use of space reserved for buffer overflow detection.

FIG. 4 is an illustration of memory pages 402, 404, 406, 408, 410 protected by use of space reserved for buffer overflow detection. A given allocation, such as allocations 414, 418, 422, that is to be made by an operating system may be given its own page, such as 402, 406, 410. Furthermore, pages 404, 408, 412 following each allocation may be frozen, locked, or otherwise designated as unreadable. Such a designation may be made in an operating system or processor memory management facility. An attempted read of such pages 404, 408, 412 may generate a fault or an interrupt. Thus, such pages cannot be used for storing actual user or process data in an allocation. In addition, each page 402, 406, 410 including an allocation may include unused space 413, 416, 418. Such spaces may remain unallocated, so that they do not place erroneous or malicious code adjacent to allocations 414, 418, 422 and thus possibly harm such allocations with a buffer overflow.

A consequence of such techniques may include that a full page of memory is required for an allocation. Such a full page of memory may include a full page of physical memory. Furthermore, such techniques may require that another full page of memory be designated as unusable. However, the additional full page may be implemented by virtual memory. In addition, an overflow of an allocation into an unwriteable page may be detected. However, an overflow of the allocation into other addressable portions of the same page, such as unused space 413, 416, 418, may be undetected. Thus, overflows into an earlier portion or overflows into a later portion may be detected, but not both. In some embodiments, system 100 may be configured to overcome one or more of these issues.

Figure 5:
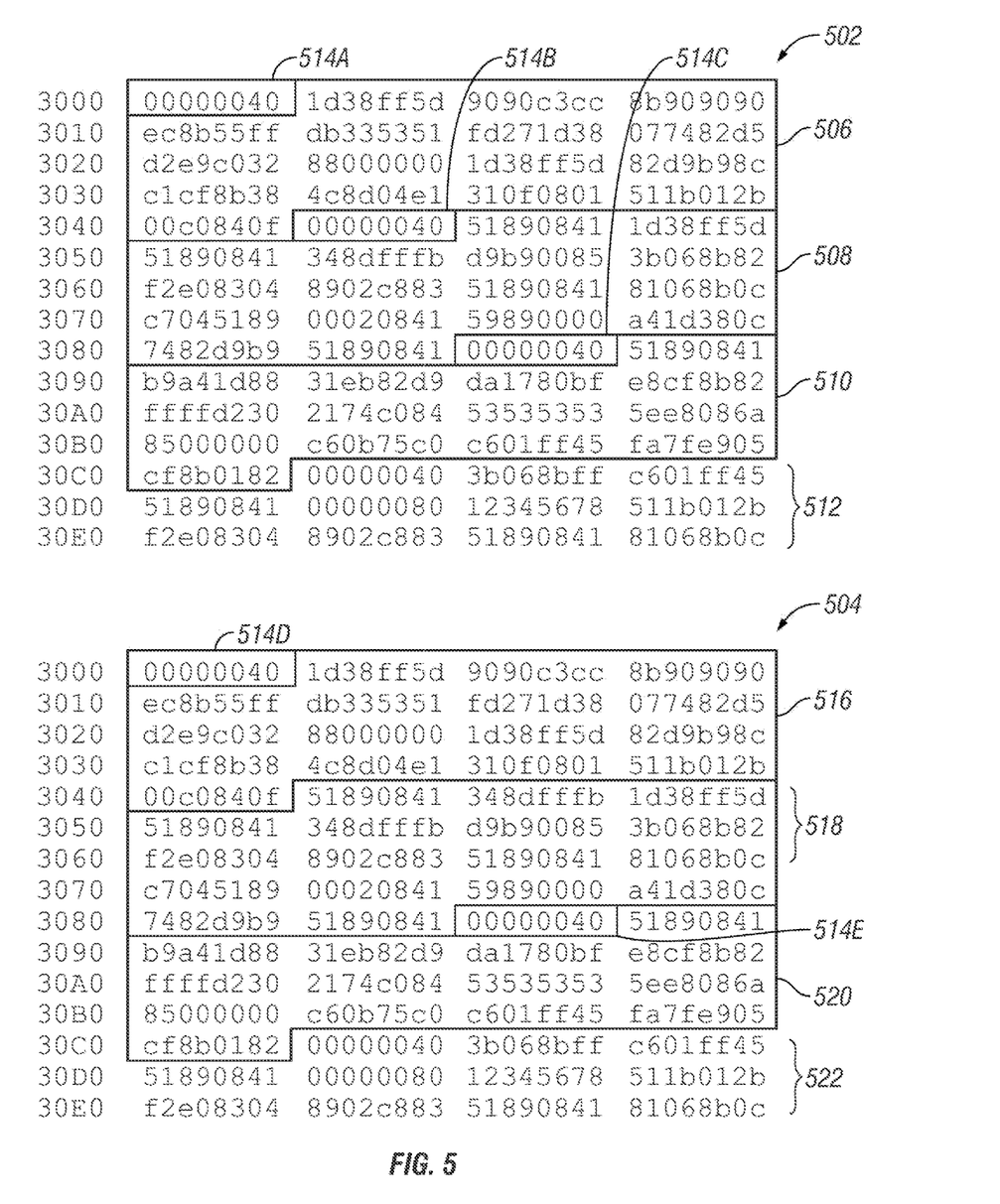
FIG. 5 is an illustration of example embodiments of memory pages protected by a hypervisor-based system for buffer overflow detection and prevention.

FIG. 5 is an illustration of example embodiments of memory pages 502, 504 protected by system 100.

Memory page 502 may include three 64-byte allocations, such as allocations 506, 508, 510. Each of allocations 506, 508, 510 may have been allocated by an operating system and may be mapped accordingly. Furthermore, each of allocations 506, 508, 510 may have been established in conjunction with a corresponding size indicator 514, defining a size of the respective allocation and embedded in a suitable location in reference to the allocation. In one embodiment, a given size indicator 514 may be located immediately before the respective allocation. As a page is read, an allocation may be managed by signaling to the reader how many bytes the allocation contains. The size of allocations may be consistent or varied for a given operating system, as needed. However, size indicator 514 may not include actual user or process data as found in the respective allocation. In addition, memory page 502 may include unused space 512. Thus, in various embodiments, the operating system responsible for allocating portions of memory may have been allowed to operate as normal, without any special handling with respect to buffer overflow detection and prevention.

Anti-malware module 108, or another suitable portion of system 100, may determine what portions of memory page 502 or memory page 504 are unallocated and which portions are allocated. Allocated portions may be written or read without, for example, being trapped, generating a VM exit, and handled by anti-malware module 108. Unallocated portions, when written or read, may generate a VM exit and may be handled by anti-malware module 108.

Thus, allocations 506, 508, 510 may be designated as writable space. Entities 114 and operating system 110, for example, may be able to write to allocations 506, 508, 510 as normal and without interruption.

In one embodiment, unused space 512 may be designated as an unallocated portion that may be designated as unwriteable or at least causing generation of a VM exit upon an attempted write. In another embodiment, size indictors 514 may be designated as an unallocated portion that may be designated as unwriteable, or at least causing generation of a VM exit upon an attempted write. Size indicators 514 may be so designated even as each is associated with an allocation, because such size indicators 514 should not be overwritten by entities other than authorized allocation and deallocation functions.

Memory page 504 may include two 64-byte allocations, such as allocations 516, 520. Each of allocations 516, 520 may have been allocated by an operating system and may be mapped accordingly. Furthermore, each of allocations 516, 520 may have been established in conjunction with a corresponding size indicator 514, defining a size of the respective allocation and embedded in a suitable location in reference to the allocation.

In addition, memory page 504 may include unused space 518 and unused space 522. Thus, memory page 504 illustrates that such unused space may exist between allocated spaces Thus, allocations 516, 520 may be designated as writable space. Entities 114 and operating system 110, for example, may be able to write to allocations 516,520 as normal and without interruption. However, unused spaces 518, 522 or to size indicators 514 may be designated as unwriteable, or at least causing a VM exit upon an attempted write.

An indication, such as a VM exit, indicating an attempted write has been made to size indicators 514 or unused spaces 512, 518, 522 space indicators, may be handled by anti-malware module 108. Anti-malware module 108 may determine whether the attempted write was made by an authorized entity, such as an allocation or deallocation function from a kernel of operating system 110. If such a write was authorized, anti-malware module 108 may allow the attempt. If such a write was not authorized, anti-malware module 108 may take corrective action for handling a buffer overflow. Anti-malware module 108 may identify memory areas adjacent to the protected space to identify possible sources of the buffer overrun.

Furthermore, the corrective action taken by anti-malware module 108 may depend upon the execution environment in which anti-malware module 108. For example, if anti-malware module 108 is used within a software debugging environment, anti-malware module 108 may be configured to break into a software debugger to notify an operator that the buffer overflow has occurred. If anti-malware module 108 is used within a typical operational environment that needs protection from malware threats, the attempted write may be blocked.

Consequently, anti-malware module 108 may protect memory pages 502, 504 without use of codes, strings, space, or memory pages whose only function is to detect buffer overflow. Other techniques may require special codes, dead space unavailable for content or other uses of electronic device 102, or entire pages marked as unwriteable. Furthermore, anti-malware module 108 may prevent buffer overflow from happening to memory pages 502, 504, whereas other techniques may only detect such overflow after it has occurred. Consequently, memory pages 502, 504, for example, may be protected while its previous and subsequent memory pages are available for normal use. In addition, memory page 502 may be protected while able to allocate multiple 64-byte allocations consecutively as would be performed without the protection. No additional values need be inserted into such allocations.

Figure 6:
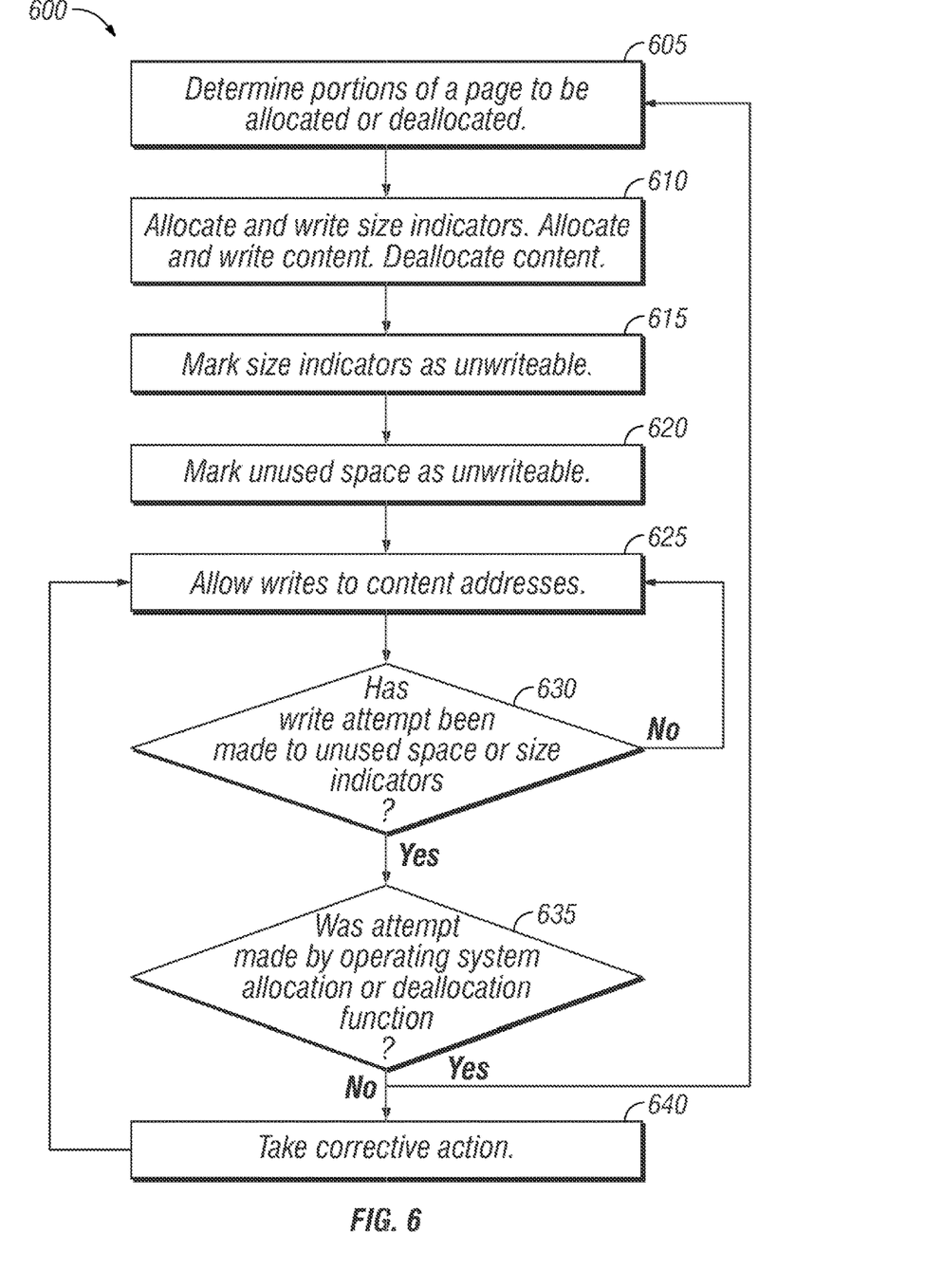
FIG. 6 is an illustration of an example embodiment of a method for hypervisor-based buffer overflow detection and prevention.

FIG. 6 is an illustration of an embodiment of an example method 600 for buffer overflow detection and prevention. Method 600 may be performed in a hypervisor or security module configured to operate below the level of one, more, or all operating systems of an electronic device.

At 605, portions of a memory page to be allocated or deallocated may be determined. Such operations may be determined by allocation or deallocation functions performed by an operating system. At 610, the operations may be carried. Portions of the page may be deallocated or allocated. Size indicators may be inserted and associated with allocated memory, such as immediately before such allocation segments.

At 615, the size indicators may be marked as unwriteable or otherwise causing, for example, a VM exit. Such indicators may be identified by address. At 620, any unused spaces may be marked as unwriteable or otherwise causing, for example, a VM exit, upon an attempted access. Such spaces may be identified by address. Other suitable portions of the page may be marked as unwriteable or otherwise causing, for example, a VM exit, upon an attempted access.

At 625, attempted writes to the allocated content portions of the page may be allowed. At 630, it may be determined whether an attempt has been made to write to unused portions of the page or to the size indicators, or to other portions of the page marked as unwriteable. If not, method 600 may return to 625.

If attempted writes have been made to unused portions of the page or to the size indicators, then in 635 the source of the attempt may be determined. It may be it may be determined whether an attempt was made from an authorized source. Such a source may include, for example, a specified allocation or deallocation function of an operating system kernel.

If the source of the attempt was authorized as, for example, an allocation or deallocation function, then the attempt may be allowed and method 600 may return to 605. If the source of the attempt was not authorized, then in 640 corrective action may be taken. Such action may include, for example, denying the attempt or notifying a user. Method 600 may return to 625.

Although FIG. 6 discloses a particular number of steps to be taken with respect to example method 600, method 600 may be executed with more or fewer steps than those depicted in FIG. 6. In addition, although FIG. 6 discloses a certain order of steps to be taken with respect to method 600 the steps comprising these methods may be completed in any suitable order. Method 600 may be implemented using the systems of FIGS. 1 and 5 or any other suitable mechanism. In certain embodiments, method 600 may be implemented partially or fully in software embodied in computer-readable storage media.

Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. Method 600 may be provided as a computer program, product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

The following examples pertain to further embodiments.

A method for securing an electronic device may include determining a memory page to be monitored, determining portions of the memory page allocated for content for applications, marking remaining portions of the memory page as unwriteable, determining an attempt to access portions of the memory page marked as unwriteable, determining whether the attempt originated from an authorized source, and, based on whether the attempt originated from an authorized source, determining whether to allow the attempt. Determining the attempt may be performed at a level below an operating system. The attempt may be from the level of the operating system. The remaining portions of the memory page may include a size indicator of an allocation. The remaining portions of the memory page may include unused memory spaces. Determining whether the attempt originated from an authorized source may include determining whether the attempt originated from an allocation function of the operating system. Determining whether the attempt originated from an authorized source may include determining whether the attempt originated from a deallocation function of the operating system. The portions of the memory page marked as unwriteable may include one or more portions of the memory between memory allocations. The access may include an attempted write.

At least one machine readable storage medium may include computer-executable instructions carried on the computer readable medium. The instructions may be readable by a processor. The instructions, when read and executed, may cause the processor to determine a memory page to be monitored, determine portions of the memory page allocated for content for applications, mark remaining portions of the memory page as unwriteable, determine an attempt to access portions of the memory page marked as unwriteable, determine whether the attempt originated from an authorized source, and, based on whether the attempt originated from an authorized source, determine whether to allow the attempt. Determining the attempt may be performed at a level below an operating system. The attempt may be from the level of the operating system. The remaining portions of the memory page may include a size indicator of an allocation. The remaining portions of the memory page may include unused memory spaces. Determining whether the attempt originated from an authorized source may include determining whether the attempt originated from an allocation function of the operating system. Determining whether the attempt originated from an authorized source may include determining whether the attempt originated from a deallocation function of the operating system. The portions of the memory page marked as unwriteable may include one or more portions of the memory between memory allocations.

A system for securing an electronic device may include means for determining a memory page to be monitored, determining portions of the memory page allocated for content for applications, marking remaining portions of the memory page as unwriteable, determining an attempt to access portions of the memory page marked as unwriteable, determining whether the attempt originated from an authorized source, and, based on whether the attempt originated from an authorized source, determining whether to allow the attempt. Determining the attempt may be performed at a level below an operating system. The attempt may be from the level of the operating system. The remaining portions of the memory page may include a size indicator of an allocation. The remaining portions of the memory page may include unused memory spaces. Determining whether the attempt originated from an authorized source may include determining whether the attempt originated from an allocation function of the operating system. Determining whether the attempt originated from an authorized source may include determining whether the attempt originated from a deallocation function of the operating system. The portions of the memory page marked as unwriteable may include one or more portions of the memory between memory allocations. The access may include an attempted write.

A system for securing an electronic device may include a memory and an anti-malware module communicatively coupled to the memory. The anti-malware module may include computer-executable instructions carried on a computer readable medium. The instructions may be readable by a processor. The instructions, when read and executed, configure the anti-malware module to determine a memory page to be monitored, determine portions of the memory page allocated for content for applications, mark remaining portions of the memory page as unwriteable, determine an attempt to access portions of the memory page marked as unwriteable, determine whether the attempt originated from an authorized source, and, based on whether the attempt originated from an authorized source, determine whether to allow the attempt. Determining the attempt may be performed at a level below an operating system. The attempt may be from the level of the operating system. The remaining portions of the memory page may include a size indicator of an allocation. The remaining portions of the memory page may include unused memory spaces. Determining whether the attempt originated from an authorized source may include determining whether the attempt originated from an allocation function of the operating system. Determining whether the attempt originated from an authorized source may include determining whether the attempt originated from a deallocation function of the operating system. The portions of the memory page marked as unwriteable may include one or more portions of the memory between memory allocations.

Although the present disclosure has been described in detail, it should be understood that various changes, substitutions, and alterations can be made hereto without departing from the spirit and the scope of the disclosure as defined by the appended claims.

What is claimed is:

1. A method for securing an electronic device, comprising:
    determining a memory page to be monitored;
    determining portions of the memory page allocated for content for applications;
    marking all remaining portions of the memory page as unallocated for content for applications and unwriteable other than by authorized functions of an operating system;
    determining, at a level below the operating system, an attempt from the level of the operating system, the attempt to access unallocated portions of the memory page marked as unwriteable other than by authorized functions of the operating system;
    determining whether the attempt originated from an authorized function of the operating system; and
    in response to a determination that the attempt did not originate from an authorized function of the operating system, blocking the attempt,
    wherein the remaining portions of the memory page include a size indicator of an allocation, the size indicator having been written to an unallocated portion of the memory page by an authorized function of the operating system,
    wherein determining whether the attempt originated from an authorized function of the operating system includes determining whether the attempt originated from a deallocation function of the operating system,
    wherein the portions of the memory page marked as unallocated for content for applications and unwriteable other than by authorized functions of the operating system include one or more portions of the memory between memory allocations.

2. The method of claim 1, wherein the remaining portions of the memory page include unused memory spaces.

3. The method of claim 1, wherein determining whether the attempt originated from an authorized function of the operating system includes determining whether the attempt originated from an allocation function of the operating system.

4. At least one non-transitory machine readable storage medium, comprising computer-executable instructions carried on the machine readable medium, the instructions readable by a processor, the instructions, when read and executed, for causing the processor to:
    determine a memory page to be monitored;
    determine portions of the memory page allocated for content for applications;
    mark all remaining portions of the memory page as unallocated for content for applications and unwriteable other than by authorized functions of an operating system;
    determine, at a level below the operating system, an attempt from the level of the operating system, the attempt to access unallocated portions of the memory page marked as unwriteable other than by authorized functions of the operating system;
    determine whether the attempt originated from an authorized function of the operating system; and
    in response to a determination that the attempt did not originate from an authorized function of the operating system, block the attempt,
    wherein the remaining portions of the memory page include a size indicator of an allocation, the size indicator having been written to an unallocated portion of the memory page by an authorized function of the operating system,
    wherein determining whether the attempt originated from an authorized function of the operating system includes determining whether the attempt originated from a deallocation function of the operating system,
    wherein the portions of the memory page marked as unallocated for content for applications and unwriteable other than by authorized functions of the operating system include one or more portions of the memory between memory allocations.

5. The medium of claim 4, wherein the remaining portions of the memory page include unused memory spaces.

6. The medium of claim 4, wherein determining whether the attempt originated from an authorized function of the operating system includes determining whether the attempt originated from an allocation function of the operating system.

7. A system for securing an electronic device, comprising:
    a processor;
    at least one non-transitory machine readable storage medium communicatively coupled to the processor and comprising computer-executable instructions carried on the machine readable medium, the instructions readable by the processor, the instructions, when read and executed, for causing the processor to:
    determine a memory page to be monitored;
    determine portions of the memory page allocated for content for applications;
    mark all remaining portions of the memory page as unallocated for content for applications and unwriteable other than by authorized functions of an operating system;
    determine, at a level below the operating system, an attempt from the level of the operating system, the attempt to write to unallocated portions of the memory page marked as unwriteable other than by authorized functions of the operating system;
    determine whether the attempt originated from an authorized function of the operating system; and
    in response to a determination that the attempt did not originate from an authorized function of the operating system, block the attempt,
    wherein the remaining portions of the memory page include a size indicator of an allocation, the size indicator having been written to an unallocated portion of the memory page by an authorized function of the operating system,
    wherein determining whether the attempt originated from an authorized function of the operating system includes determining whether the attempt originated from a deallocation function of the operating system, wherein the portions of the memory page marked as unallocated for content for applications and unwriteable other than by authorized functions of the operating system include one or more portions of the memory between memory allocations.

8. The system of claim 7, wherein the remaining portions of the memory page include unused memory spaces.

9. The system of claim 7, wherein determining whether the attempt originated from an authorized function of the operating system includes determining whether the attempt originated from an allocation function of the operating system.

* * * * *